April 15, 1958 L. D. SMULLIN ET AL Re. 24,460

TRAVELING WAVE AMPLIFIER TUBE

Original Filed July 3, 1947

INVENTORS
GORDON C. DEWEY
LOUIS D. SMULLIN

BY Robert Harding Jr
ATTORNEY

United States Patent Office

Re. 24,460
Reissued Apr. 15, 1958

24,460

TRAVELING WAVE AMPLIFIER TUBE

Louis D. Smullin, Watertown, Mass., and Gordon C. Dewey, New York, N. Y., assignors to International Standard Electric Corp., New York, N. Y., a corporation of Delaware Original No. 2,624,859, dated January 6, 1953, Serial No. 758,848, July 3, 1947. Application for reissue November 22, 1954, Serial No. 470,557

4 Claims. (Cl. 315—3.5)

Figure 1:
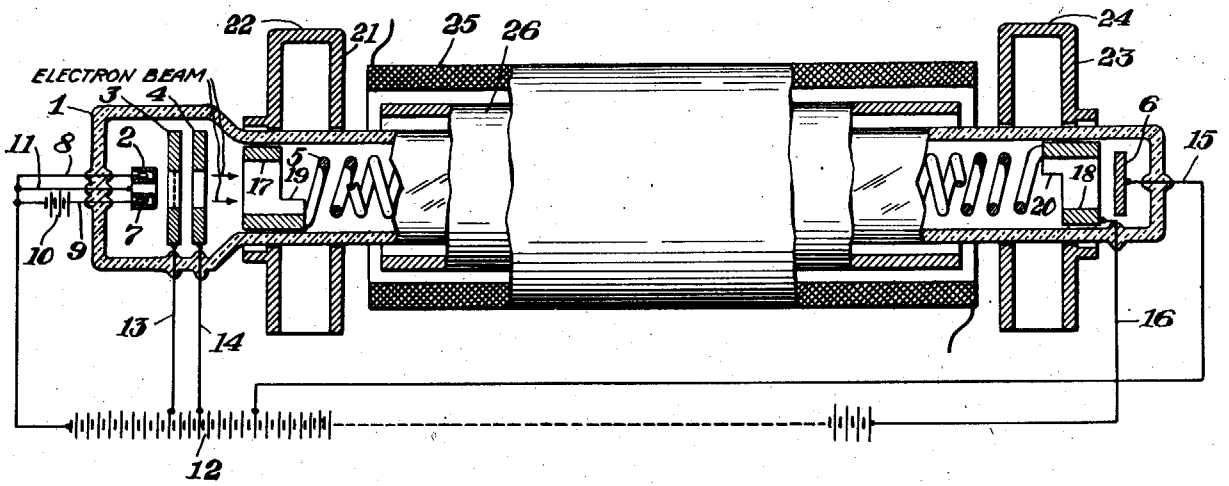

Matter enclosed in heavy brackets [ ] appears in the original patent but forms no part of this reissue specification; matter printed in italics indicates the additions made by reissue.

Our invention relates to amplifiers of the travelling wave type and has for its object the prevention of ringing and oscillating of such amplifiers.

Travelling wave tubes, known generally to the art today, consist of a tightly wound helix down which an electromagnetic wave can propogate. The phase velocity of propagation of the electromagnetic wave along the axis of the helix is small compared to the velocity of light and the mode of propagation of this wave is called the slowed-up mode. An electron beam is arranged to direct a stream of electrons axially through the helix. When the [levocity] *velocity* of the electrons in the stream is slightly greater than the phase velocity of the wave, part of the kinetic energy of the electrons is converted into radio frequency energy and the electromagnetic wave which is propagated in the direction of the electron stream is amplified.

Such travelling wave amplifiers have a tendency to ring or oscillate under certain conditions of insertion loss and overall gain and therefore the helix has been made lossy to prevent any ringing which is the result of mismatches at the input and output terminations. The conditions for the prevention of ringing are that the product $$G \times L < 1$$

where G is the gain of the wave travelling forward from the input to the output terminations and L is the attenuation of the wave reflected from the output to the input teminations or couplings.

We have discovered that ringing still occurs in a travelling wave amplifier tube when the product $$G \times L << 1$$

Under such conditions oscillations could not be supported by the travelling wave amplifier tube if only the one slowed-up mode of propagation were possible along the helix or slow transmission line. Therefore another method of feedback from the output to the input is present, this feedback causing the ringing. This feedback consists of another mode of propagation along the helix or slow transmission line, which mode is relatively unattenuated by the lossy helix.

It is accordingly an object of this invention to prevent the ringing of a travelling wave amplifier by preferentially damping the feedback from the modes of propagation through the helix other than the slowed-up mode.

It is a further object of this invention to prevent the ringing of a travelling wave amplifier by preferential damping without seriously changing cold insertion loss of the tube.

It is a further object of this invention to prevent the ringing of a travelling wave amplifier by preferential damping without seriously increasing the attenuation offered to waves in the slowed-up mode of propagation.

We accomplish these and other objects by placing lossy or absorbing material (that is, a material that will attenuate electromagnetic waves that pass therethrough) adjacent the helix of the conventional travelling wave amplifier tube in a region in which the electromagnetic wave travelling in a fast mode through said helix is strong and the wave travelling in the slowed-up mode is extremely weak or effectively negligible. In a specific embodiment we accomplish these objects by placing the [loosy] *lossy* or absorbent material about the glass envelope surrounding the helix and between the glass envelope and the focusing solenoid which also surrounds the glass envelope.

Figure 4:
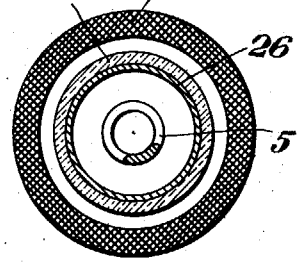
Figure 3:
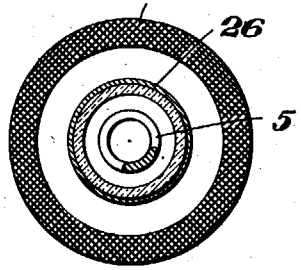
Figure 2:
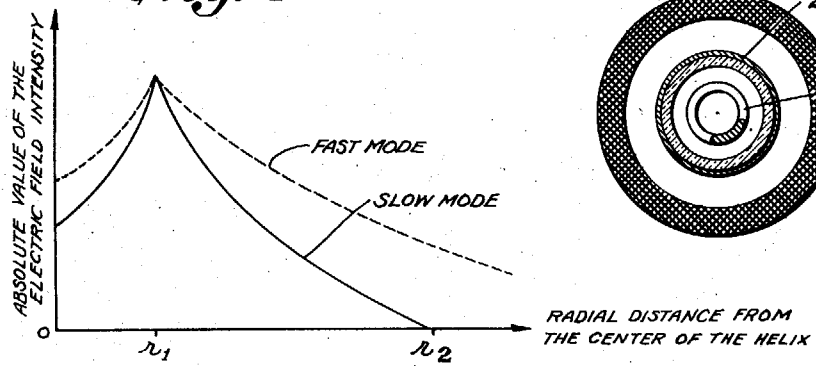

The above-mentioned objects and features and others will be more readily understood with reference to the following description of a specific embodiment and with reference to the attached drawings of which Fig. 1 is a cross-sectional view of a travelling wave tube showing features of my invention;

Fig. 2 is a graph of the magnitudes of the intensities of the electro-magnetic waves travelling in the slowed-up mode and in another mode relative to their maximum values through the helix as a function of the distance from the center of the helix; and Figs. 3 and 4 are cross-sectional views of a travelling wave tube showing two other embodiments of our invention.

The tube of our invention is generally illustrated in Fig. 1. An envelope 1 encloses an electron gun *consisting of a cathode 2 and* [2] focusing electrodes 3 and 4, tightly wound helix 5, and collector electrode 6, arranged in the order named from end to end of the tube. The axis of the helix 5 is aligned with the *cathode* [electron gun] 2 which is indirectly heated by coil 7, leads 8 and 9 of said *coil* [coal] being connected across a battery 10. A lead 11 from the *cathode* [electron gun] is connected to the negative side of a high tension source 12. Leads 13 and 14 from focusing electrodes 3 and 4 are connected to low voltage points of said source 12. A lead 15 from collector electrode 6 is also connected to a low voltage point of the source. This is done so that the unconverted portion of the kinetic energy of the beam does not necessarily appear as dissipated power at the collector electrode. A lead 16 from the helix 5 is connected to the positive end of the high tension source 12.

The helix 5 is connected at either end to metal cylinders or collars 17 and 18, each arranged coaxially about the beam path and adapted to fit inside the glass envelope. The helix 5 is connected to the collars 17 and 18 by means of straight conducting stubs 19 and 20. A rectangular wave guide 21 provided with apertures therethrough and closed at one end 22 is arranged with the envelope of the tube through the apertures such that the stub 19 which is connected to the helix at the end adjacent the electron gun projects into the guide 21. The guide 21 constitutes the input wave guide. Similarly an apertured rectangular wave guide 23 with a closed end 24 is arranged with the stub 20 projecting therein. The guide 23 constitutes the output wave guide.

A solenoid 25 is arranged coaxially about the helix 5 for focusing the beam therethrough. According to the present invention a lossy material 26 such as granulated carbon in a binder or a thin metallic film or coating whose thickness is small compared to their skin depth, is arranged coaxially about the glass envelope between the envelope and the solenoid or coated in the glass envelope on the outside thereof (see Fig. 3) or on the inside thereof (see Fig. 4).

The operation of the device is as follows: An ultra high frequency wave is fed through wave guide 21 to the helical guide 5. The helix 5 propagates the wave therealong from the end adjacent the electron gun to the end adjacent the collector electrode in a slowed-up mode. The axial velocity of the wave is small compared to the velocity of light. An electron beam is directed axially through the helix at a velocity slightly greater than the axial phase velocity. The wave has an axial electric field component which slows up the electrons in the beam and thus the kinetic energy of the beam is transformed into electromagnetic energy and the wave taken off in the output guide is amplified.

If the impedance matching between the output guide 23 and the helical guide via the stub 20 is not perfect there will be reflection of the electromagnetic waves through the helix from the collector towards the electron gun. The reflected waves constitute feedback and they cause the tube to oscillate.

The helix may be made lossy, that is, it may be made to attenuate the reflected wave. However, experiment shows that oscillations occur with a lossy helix in which $G \times L << 1$. This suggests that there exists a wave travelling in a faster mode along the axis of the helix. In fact the wave travels with approximately the velocity of light. The fast mode suffers much less attenuation due to the lossy helix since there are fewer wave lengths of it than of the wave of the slowed-up mode.

Experiments show that a lossy material placed between the glass envelope of the tube and the focusing solenoid cause a marked reduction in the tendency to oscillate. By proper adjustment of the lossy material the oscillations are completely stopped without seriously changing the cold insertion loss of the tube.

This suggests that the wave travelling in the fast mode falls off much less rapidly in the radial direction away from the helix than the wave in the slow mode. Mathematical studies confirm this as shown graphically in Fig. 2. The absolute values of the electric field intensities of waves travelling in the slow and the fast modes are a maximum at a radius $r_1$ from the center of the helix, the helix itself having a madius $r_1$. The field intensity of the slowed up wave falls off rapidly for values of radius greater than $r_1$ and is practically negligible for a radius $r_2$. The electric field intensity of the fast wave falls off much less rapidly for values of the radius greater than $r_1$ and is of substantial intensity at the distance $r_2$ from the center of the helix. A lossy material of proper attenuation characteristic and of cylindrical shape of radius $r_2$ will attenuate the wave of the unwanted fast mode and will have negligible effect upon that of the wanted slow mode.

While we have described our invention with reference to a particular embodiment, it is not intended to be limited thereto but only as defined in the appended claims.

What we claim is:

[1. A travelling wave amplifier comprising an electron gun and a collector electrode defining an electron beam path therebetween, an envelope about said gun and said collector electrode, a wave guide including a helix of wire located about said beam path for propagating an electromagnetic wave along said beam path in the direction from said gun to said collector electrode, said electromagnetic wave being propagated along said wave guide with an axial phase velocity slightly less than the velocity of the electrons in said beam and a length of electromagnetic field attenuation material disposed and extending therealong for substantially the entire length thereof, said attenuation material comprising a cylindrical form of lossy material located coaxially about said helix of wire, said helix being located inside said envelope and said attenuation material being located outside and about said envelope.]

[2. A travelling wave amplifier comprising an electron gun and a collector electrode defining an electron beam path therebetween, an envelope about said gun and said collector electrode, a wave guide including a helix of wire located about said beam path for propagating an electromagnetic wave along said beam path in the direction from said gun to said collector electrode, said electromagnetic wave being propagated along said wave guide with an axial phase velocity slightly less than the velocity of the electrons in said beam and a length of electromagnetic field attenuation material disposed and extending therealong for substantially the entire length thereof, said attenuation material comprising a cylindrical form of lossy material located coaxially about said helix of wire, said helix being located inside said envelope and said attenuation material comprising a coating of lossy material on the outside of said envelope.]

*3. A travelling wave amplifier comprising an electron gun and a collector electrode defining an electron beam path therebetween, an envelope about said gun and said collector electrode, a wave guiding structure for propagating an electromagnetic wave alongside said beam path with an axial phase velocity so related to the velocity of the electrons in said beam as to transfer energy from said beam to said wave, said wave having components travelling in the reverse direction in a slow and fast mode, means for attenuating the reverse waves in said slow mode to reduce the tendency toward unwanted oscillations, and a length of electromagnetic field attenuation material disposed and extending along said structure for a substantial length thereof within the field of said wave, and at a radial distance from the longitudinal axis of said structure greater than the radial distance from said axis of said means for attenuating in the region beyond that at which the field intensity of the wave in the fast and slow modes are at a maximum.*

*4. A travelling wave amplifier comprising an electron gun and a collector electrode defining an electron beam path therebetween, an envelope about said gun and said collector electrode, a wave guide including a helix of wire located about said beam path for propagating an electromagnetic wave along said beam path in the direction from said gun to said collector electrode, with an axial velocity so related to the velocity of the electrons in said beam as to transfer energy from said beam to said wave, said wave having components travelling in the reverse direction in a slow and fast mode, means for attenuating the reverse waves in said slow mode to reduce the tendency toward unwanted oscillation, and a length of electromagnetic field attenuation material disposed and extending therealong for a substantial part of the length thereof within the field of said wave, said attenuation material comprising a lossy material located at a radial distance from the axis of the helix greater than the radial distance from said axis of said means for attenuating in said region beyond that in which the intensity of the wave in the slow and fast mode is at a maximum.*

*5. A travelling wave amplifier comprising an electron gun and a collector electrode defining an electron beam path therebetween, an envelope about said gun and said collector electrode, a wave guiding structure for propagating an electromagnetic wave alongside said beam path with an axial phase velocity so related to the velocity of the electrons in said beam as to transfer energy from said beam to said wave, said wave having components travelling in the reverse direction in a slow and fast mode, means for attenuating the reverse waves in said slow mode to reduce the tendency toward unwanted oscillation, and a length of electromagnetic field attenuation material disposed and extending along said structure for a substantial length thereof within the field of said wave, and at a radial distance from the longitudinal axis of said structure greater than the radial distance from said axis of said means for attenuating and at a point where the relative amplitude of the wave in the fast mode is high relative to its maximum value and the wave in the slow mode is weak relative to its maximum value whereby*

*the tendency of the reverse wave in the fast mode to produce unwanted oscillations is reduced.*

*6. A travelling wave amplifier comprising an electron gun and a collector electrode defining an electron beam path therebetween, an envelope about said gun and said collector electrode, a wave guide including a helix of wire located about said beam path for propagating an electromagnetic wave along said beam path in the direction from said gun to said collector electrode, with an axial phase velocity so related to the velocity of the electrons in said beam as to transfer energy from said beam to said wave, said wave having components travelling in the reverse direction in a slow and fast mode, means for attenuating the reverse waves in said slow mode to reduce the tendency toward unwanted oscillations, and a length of electromagnetic field attenuation material disposed and extending therealong for a substantial part of the length thereof within the field of said wave, said attenuation material comprising a lossy material located at a radial distance from the axis of the helix greater than the radial distance from said axis of said means for attenuating and at a point where the relative amplitude of the wave in the fast mode is high relative to its maximum value and the wave in the low mode is weak relative to its maximum value whereby the tendency of the reverse wave in the fast mode to produce unwanted oscillations is reduced.*

References Cited in the file of this patent or the original patent

UNITED STATES PATENTS

| | | |
|---|---|---|
| 1,957,538 | Jensen | May 8, 1934 |
| 2,233,126 | Haeff | Feb. 25, 1941 |
| 2,300,052 | Lindenblad | Oct. 27, 1942 |
| 2,367,295 | Llewellyn | Jan. 16, 1945 |
| 2,413,608 | Di Toro | Dec. 31, 1946 |
| 2,636,948 | Pierce | Apr. 28, 1953 |